(No Model.)

J. E. BRENNEISEN.
SINGLETREE HOOK.

No. 564,954. Patented July 28, 1896.

Witnesses
H. J. Koerth
V. B. Hillyard

Inventor
John E. Brenneisen,
By his Attorneys,
C. A. Snow & Co.

UNITED STATES PATENT OFFICE.

JOHN E. BRENNEISEN, OF UNIONVILLE, MARYLAND, ASSIGNOR OF ONE-HALF TO GEORGE D. NORRIS, BRADLEY T. NICODEMUS, JACOB O. WILLIARD, W. H. H. PEARRE, AND WILLIARD A. NICODEMUS, OF SAME PLACE.

SINGLETREE-HOOK.

SPECIFICATION forming part of Letters Patent No. 564,954, dated July 28, 1896.

Application filed December 31, 1895. Serial No. 573,941. (No model.)

*To all whom it may concern:*

Be it known that I, JOHN E. BRENNEISEN, a citizen of the United States, residing at Unionville, in the county of Frederick and State of Maryland, have invented a new and useful Singletree-Hook, of which the following is a specification.

This invention relates to trace-fasteners for connecting the trace to a singletree in such a manner as to secure it against accidental displacement, and aims to improve that class of fastenings which consist of a hook and a notched disk rotatably mounted in the hook so as to secure the trace, the latter entering the notch of the disk, which is then given a turn to throw the notch and the throat of the hook out of register, whereby the trace is held secure. In this class of fastenings the hook is constructed so as to snugly embrace the edge of the disk, so that the latter is incapable of other than a rotary movement. Hence it frequently happens that the swaying of the trace and singletree brings the notch of the disk in register with the throat of the hook and the trace becomes disconnected. By the present invention this cannot happen, as the disk has a limited play in the hook, and when the notch nearly reaches the throat of the hook the disk will wedge and bind and be held against further rotation, thereby preventing the notch and throat from coming into register.

Various other objects and advantages are contemplated and will appear as the invention is disclosed, and for a full understanding of the improvement reference is to be had to the following description and the accompanying drawings, in which—

Figure 1:
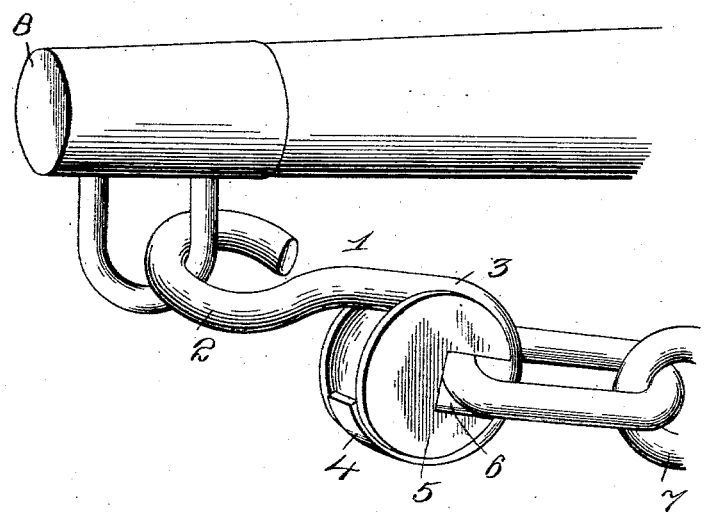
Figure 2:
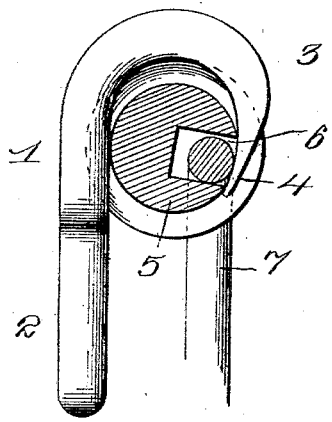
Figure 3:
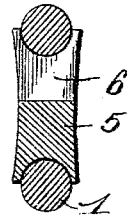

Figure 1 is a perspective view of an end portion of a singletree, showing the invention applied. Fig. 2 is a detail view showing the locking-disk in section and in the position which it will occupy when held against rotation by becoming wedged in the hook. Fig. 3 is a transverse section.

Corresponding and similar parts will be designated in the description and the figures of the drawings by the same reference-numerals.

The fastener comprises a shank 1, having an eye 2 at one end and a hook 3 at the opposite end, the bill or end portion 4 of the hook being deflected away from the circle upon which the main portion of the hook 3 is formed, whereby the locking-disk 5 is adapted to have a limited play to and from the opening or throat of the hook, for a purpose presently to be made known.

The locking-disk 5 is circular in outline and is grooved in its periphery to receive the hook 3, which latter is seated in the said groove, thereby preventing lateral displacement of the disk and directing it in its rotary movements. A notch 6 is formed in the edge of the locking-disk and receives the cockeye or link of the trace 7 in the usual way, and when the disk is turned so as to throw the notch 6 out of register with the throat of the hook the said trace will be securely held in engagement with the hook. This disk is preferably cast, and the fastener is of wrought-iron, and the hook is bent so as to encircle the locking-disk and prevent its displacement.

When it is required to attach or remove a trace or similar part from the hook, the notch 6 is brought in register with the throat of the hook, and after the part to be connected is placed within the notch 6 the disk is turned so as to throw the notch out of register with the throat or opening of the hook, thereby securing the part thus connected with the hook. It will be remembered that by deflecting the bill or end portion of the hook outwardly provision is had for admitting of the disk having a limited play. Hence should from any cause the hook assume an upright position and the disk be turned by the weight of the trace or other part attached to the hook so as to bring the notch nearly in register with the throat of the hook the said disk will gravitate and become wedged between the bill 4 and the shank 1, thereby preventing the disk from further rotation, hence securing the trace from accidental displacement. In this position of the parts the bill 4 extends across the open side of the notch 6 and touches the latter at points remotely separated, and the effect is the same as if that portion of the disk opposite the notch 6 were flattened to bear against the bill 4 and cause the wedging or binding of the disk in the manner set forth.

While the invention is shown and referred to in connection with a singletree 8 and a trace 7, it is to be understood that it can be applied to a cow-chain, fifth-chain, breast-chain, and to other parts of harness where lock snap-hooks are usually employed.

Having thus described the invention, what is claimed as new is—

1. A fastener comprising a hook circularly formed and having a portion deflected away from the circular outline, and a notched locking-disk mounted in the hook and capable of rotary movement and longitudinal play, whereby in the event of its notch nearly coming in register with the throat of the hook the said disk will automatically become wedged and be held from further rotation, substantially in the manner set forth for the purpose described.

2. The herein shown and described fastener, comprising a shank having an eye and formed with an approximately circular hook, and having the bill of the hook deflected away from the circle upon which the main body of the hook is formed, and a notched locking-disk mounted in the hook and adapted to have a rotary and a limited longitudinal movement therein, the latter providing for the automatic wedging and binding of the disk to prevent its further rotation when the notch nearly comes in register with the throat of the hook from abnormal causes, substantially as set forth for the purpose described.

In testimony that I claim the foregoing as my own I have hereto affixed my signature in the presence of two witnesses.

JOHN E. BRENNEISEN.

Witnesses:
EDWARD REISLER,
WM. STEPHENS.